United States Patent
Keene

(10) Patent No.: US 10,094,125 B2
(45) Date of Patent: Oct. 9, 2018

(54) FLOOR DRAINAGE AND VENTILATION DEVICE, SYSTEM, AND METHOD

(71) Applicant: Keene Building Products Co., Inc., Mayfield Heights, OH (US)

(72) Inventor: James R. Keene, Pepper Pike, OH (US)

(73) Assignee: Keene Building Products Co., Inc., Mayfield Heights, OH (US)

( * ) Notice: Subject to any disclaimer, the term of this patent is extended or adjusted under 35 U.S.C. 154(b) by 0 days.

(21) Appl. No.: 15/196,777

(22) Filed: Jun. 29, 2016

(65) Prior Publication Data

US 2016/0376794 A1 Dec. 29, 2016

Related U.S. Application Data

(60) Provisional application No. 62/185,849, filed on Jun. 29, 2015.

(51) Int. Cl.
*A47G 27/02* (2006.01)
*B32B 27/12* (2006.01)
(Continued)

(52) U.S. Cl.
CPC .............. *E04F 15/186* (2013.01); *B32B 3/06* (2013.01); *B32B 3/08* (2013.01); *B32B 3/10* (2013.01); *B32B 5/02* (2013.01); *B32B 5/06* (2013.01); *B32B 5/08* (2013.01); *B32B 5/26* (2013.01); *B32B 7/06* (2013.01); *B32B 7/12* (2013.01); *B32B 13/14* (2013.01); *B32B 21/10* (2013.01);
(Continued)

(58) Field of Classification Search
CPC .... Y10T 428/14; E04F 15/186; E04F 15/203; B32B 5/06; B32B 5/02; B32B 5/08; B32B 5/26; B32B 7/12; B32B 13/14; B32B 21/10; B32B 3/06; B32B 3/08; B32B 3/10; B32B 7/06; B32B 2262/0253; B32B 2262/0261; B32B 2262/0238; B32B 2262/0246; B32B 2262/0276; B32B 2262/101; B32B 2262/14; B32B 2471/00; B32B 2255/02; B32B 2255/26; B32B 2307/7145; B32B 2307/724; B32B 2307/726; B32B 2307/748; B32B 2419/04

See application file for complete search history.

(56) References Cited

U.S. PATENT DOCUMENTS 3,577,894 A * 5/1971 Emerson, Jr. ......... E01C 13/045
404/31
4,617,219 A * 10/1986 Schupack ............... B32B 13/14
264/333
(Continued)

FOREIGN PATENT DOCUMENTS

WO WO-9917932 A2 * 4/1999 ............. A01N 25/34

*Primary Examiner* — Patricia L. Nordmeyer
(74) *Attorney, Agent, or Firm* — Renner, Otto, Boisselle & Sklar, LLP

(57) ABSTRACT

The present disclosure provides a floor drainage and ventilation device, system, and method while further providing cushioning and resiliency. The floor drainage and ventilation device provided by the disclosure includes a web of extruded polymer monofilaments. The floor drainage and ventilation system and method provided by the disclosure include a web of extruded polymer monofilaments between a substrate layer and a finish layer.

17 Claims, 4 Drawing Sheets

(51) Int. Cl.
*B32B 7/06* (2006.01)
*B32B 7/12* (2006.01)
*D04H 3/16* (2006.01)
*B32B 5/02* (2006.01)
*E04F 15/18* (2006.01)
*B32B 5/06* (2006.01)
*B32B 5/08* (2006.01)
*B32B 5/26* (2006.01)
*B32B 13/14* (2006.01)
*B32B 21/10* (2006.01)
*B32B 3/06* (2006.01)
*B32B 3/08* (2006.01)
*B32B 3/10* (2006.01)
*E04F 15/20* (2006.01)

(52) U.S. Cl.
CPC ........ *E04F 15/203* (2013.01); *B32B 2255/02* (2013.01); *B32B 2255/26* (2013.01); *B32B 2262/0238* (2013.01); *B32B 2262/0246* (2013.01); *B32B 2262/0253* (2013.01); *B32B 2262/0261* (2013.01); *B32B 2262/0276* (2013.01); *B32B 2262/101* (2013.01); *B32B 2262/14* (2013.01); *B32B 2307/7145* (2013.01); *B32B 2307/724* (2013.01); *B32B 2307/726* (2013.01); *B32B 2307/748* (2013.01); *B32B 2419/04* (2013.01); *B32B 2471/00* (2013.01)

(56) References Cited

U.S. PATENT DOCUMENTS

| | | | |
|---|---|---|---|
| 4,762,581 A * | 8/1988 | Stancliffe | B29C 61/02 156/84 |
| 6,479,117 B1 * | 11/2002 | Phillips | E02D 31/02 428/141 |
| 6,804,922 B1 * | 10/2004 | Egan | B32B 5/02 52/309.1 |
| 8,146,310 B2 | 4/2012 | Keene | |
| 2013/0084419 A1 * | 4/2013 | Taylor | B32B 27/12 428/41.8 |
| 2015/0068838 A1 | 3/2015 | Keene | |

* cited by examiner

FLOOR DRAINAGE AND VENTILATION DEVICE, SYSTEM, AND METHOD

This application claims the benefit under 35 U.S.C. § 119(e) to U.S. Provisional Application No. 62/185,849 filed on Jun. 29, 2015. The application is incorporated herein by reference in its entirety.

TECHNICAL FIELD

The present disclosure relates generally to floor drainage and ventilation, and more particularly to a floor drainage and ventilation device, system, and method that includes a web of extruded polymer monofilaments.

BACKGROUND

Drainage and ventilation are an important part of floor design. Conventional flooring designs include a sponge-like device used under the floor finish. The sponge-like device is made in a cumbersome process of binding scrap foam with an expensive adhesive binder. The mix of adhesive and foam is formed into a large cylinder and subsequently peeled to create a uniform thickness sheet. The final product is highly absorptive of moisture, moisture vapor, odors, dust, and debris. The foam is often the source of odors in a living space and often holds moisture that wicks into the soft, malleable floor finish. Wood and concrete can absorb the moisture and become permanently odiferous. The sponge-like foam is very difficult to clean and dry and has no means on its own of preventing moisture issues.

SUMMARY

The present disclosure provides a floor drainage and ventilation device, system, and method that further provides cushioning and resiliency. The floor drainage and ventilation device includes a web of extruded polymer monofilaments. The floor drainage and ventilation system and method include a web of extruded polymer monofilaments between a substrate layer and a finish layer.

In accordance with one aspect of the present disclosure, a floor drainage and ventilation system includes: a web of extruded polymer monofilaments, the polymer monofilaments being heat welded at junctions to form a matrix of tangled monofilaments, the web having a top surface and a bottom surface; a substrate layer facing the bottom surface of the web; and a finish layer facing the top surface of the web.

In one embodiment, the polymer monofilaments are made of a material selected from polyolefin, polyamide, polyester, polyvinylhalide, polystyrene, polyvinylester, or a mixture of two or more thereof.

In another embodiment, the polymer monofilaments are made of a material selected from polyethylene, polypropylene, or a mixture thereof.

In another embodiment, the polymer monofilaments have an average diameter in the range from 1 mil to 4 mils.

In another embodiment, the web includes a plurality of spacer elements projecting upwardly from the top surface of the web, each spacer element having a top surface at an apex of the spacer element.

In another embodiment, the top surfaces of the plurality of upwardly projecting spacer elements provide a contact surface of less than 75%, based on the total area covered by the web.

In another embodiment, the web further includes antimicrobial ingredients.

In another embodiment, the bottom surface of the web is attached to a backing.

In another embodiment, the backing includes a removable pressure sensitive adhesive having a release liner.

In another embodiment, the backing includes a fabric layer.

In another embodiment, the fabric layer includes a plurality of fiberglass strands.

In another embodiment, the system further includes at least one membrane layer between the finish layer and the web or between the substrate layer and the web.

In another embodiment, the membrane layer is made of rubber, polyvinyl chloride, bitumen, or a mixture of two or more thereof.

In another embodiment, the device is a roll material.

In another embodiment, the substrate layer includes wood, concrete, or a combination thereof.

In another embodiment, the finish layer includes wood, carpet, tile, concrete, or a combination of one or more thereof.

In another embodiment, the web is secure to the substrate layer with adhesive, staples, nails, screws, or a mixture of two or more thereof.

In another embodiment, the system further includes at least one wood strip attached to the substrate layer, the wood strip having at least one nail protruding upwardly from the wood strip, wherein the web is secured by entangling the nail in the web.

In accordance with another aspect of the present disclosure, a method for draining and ventilating a floor includes: installing a web of extruded polymer monofilaments between a substrate layer and a finish layer, the polymer monofilaments being heat welded at junctions to form a matrix of tangled monofilaments, and the web having a top surface and a bottom surface, wherein, the substrate layer faces the bottom surface of the web; and the finish layer faces the top surface of the web.

In one embodiment, the web is a roll material installed by rolling out the web such that the bottom surface contacts the substrate layer.

DETAILED DESCRIPTION

Figure 1:
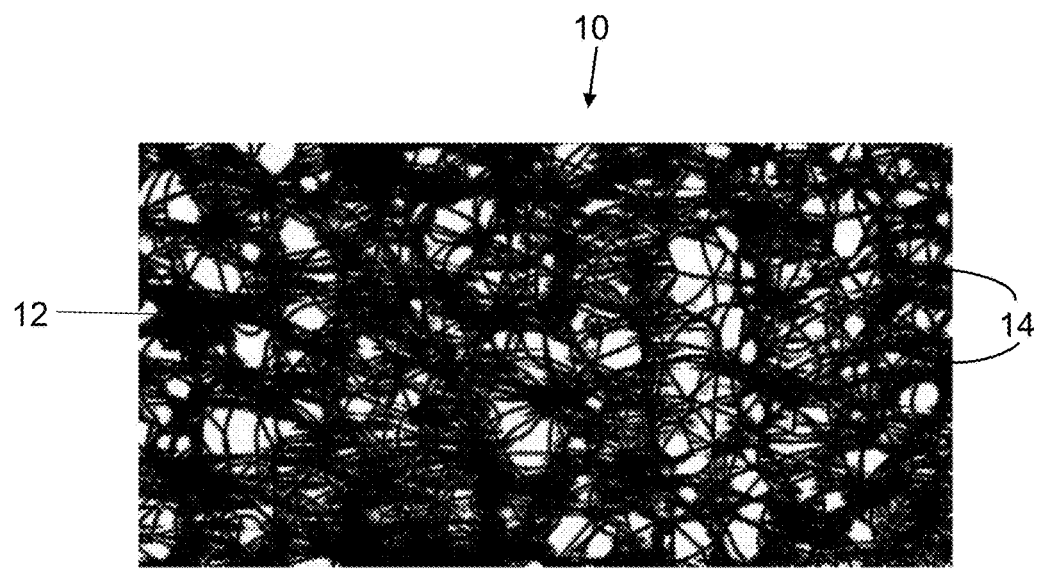
FIG. 1 is a plan view of an exemplary floor drainage and ventilation device according to the disclosure.

In the description that follows, like components have been given the same reference numerals, regardless of whether they are shown in different embodiments. To illustrate an embodiment(s) of the present disclosure in a clear and concise manner, the drawings may not necessarily be to scale and certain features may be shown in somewhat schematic form. Features that are described and/or illustrated with respect to one embodiment may be used in the same way or in a similar way in one or more other embodiments and/or in combination with or instead of the features of the other embodiments.

An exemplary floor drainage and ventilation device includes a web of extruded polymer monofilaments. The polymer monofilaments are heat welded at junctions to form a matrix of tangled monofilaments. The web is a resilient, open structure that allows for removal of moisture from the finished flooring surface and creates a drying potential that greatly enhances the longevity of the flooring finish. The web may also be modified to create a flexibility that is soft for walking traffic. The device may be included in a floor drainage and ventilation system between a finish layer and a substrate layer. The device may be installed between a finish layer and a substrate layer as a method for draining and ventilating a floor of a building.

Referring now in detail to the drawings, and initially to FIG. 1, a floor drainage and ventilation device is shown at 10. The depicted device 10 includes a web 12 of extruded polymer monofilaments 14. The monofilaments 14 are heat welded at junctions to form a matrix of tangled monofilaments 14. The monofilaments 14 of the web 12 may be made from any thermoplastic polymer that provides the desired properties of flexibility and resiliency when included in the device 10. The monofilaments 14 may be made of polyolefin (e.g., polyethylene, polypropylene, etc.), polyimide (e.g., Nylon), polyester, polyvinylhalide (e.g., polyvinylchloride (PVC), polyvinylidene chloride, polyvinyltetrafluoride, or polyvinylchlorotrifluoride), polystyrene, polyvinylester (e.g., polyvinyl acetate, etc.), or a mixture of two or more thereof.

The monofilaments 14 are extruded onto a substrate having the desired structural profile to form the web 12. The web 12 is preferably constructed in accordance with techniques well known to one of ordinary skill in the art, such as disclosed by, for example, U.S. Pat. Nos. 3,687,759; 3,691,004; and 4,212,692, the contents of all of which are hereby incorporated by reference in their entireties. Due to its filamentatious structure, the web 12 contains a great number of mutually interconnected voids that allow gases and liquid to flow freely therethrough.

Different individuals may desire different levels of cushioning on the floor surface, particularly under soft floor coverings, such as wall to wall carpet, carpet tiles or outdoor carpet. The pile of the carpet may include cut pile (e.g., saxony, texture and textured saxonies, plush or frieze), cut and loop pile, level loop pile (e.g. berber), multi-level loop pile or a combination thereof.

Some might like a significant cushion while others might enjoy stiff support, such as someone that has difficulty walking. The device 10 can be adjusted during manufacturing to provide different levels of cushion of flex.

The device 10 may be created in a geometry that moves with the flexibility of the soft floor covering of the floor finish. The device 10 may be used as a carpet pad. The carpet pad may protect the carpet. The carpet pad may keep the underside of the carpet from wearing against the bare floor. The carpet pad may adsorb the impact from footsteps and furniture, reducing the stress on the carpet. The carpet pad may create a softer feel to the carpet. The carpet pad may provide thermal insulation. The carpet pad may dampen sound.

In one example, the monofilaments 14 may have an average diameter in the range of 0.25 mil to 6 mils, or in another example in the range of 0.50 mil to 5 mils, or in another example in the range of 0.75 mil to 4.5 mils, or in another example in the range of 1 mil to 4 mils.

In one example, the thickness of the web 12 may be in the range of 0.125 inch to 0.75 inch, or in another example, in the range of about 0.25 inch to about 0.375 inch.

In one example, the width of the web 12 may be in the range of 5 feet to 15 feet, or in another example, in the range of about 9 feet to about 12 feet.

Figure 2:
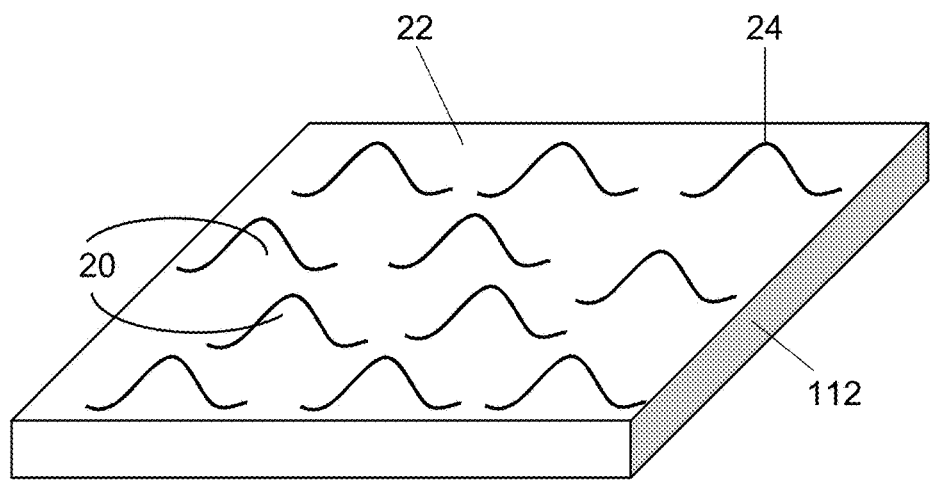
FIG. 2 is an oblique view of an embodiment of the device of FIG. 1, wherein the device includes a plurality of spacer elements.

Referring to FIG. 2, the web 112 is configured to include a plurality of spacer elements 20 projecting upwardly from the top surface 22 of the web 112. Each spacer element 20 has a top surface 24 at the apex of the spacer element 20. The spacer elements 20 create a flat surface that is created in a geometry that moves with the flexibility of the finished surface of a floor finish layer.

In one example, the web 112 may include anti-microbial ingredients. The anti-microbial ingredients may be added during manufacturing to prevent dust mites, molds, and other insects and bacteria that may form below a floor finish layer.

Figure 3:
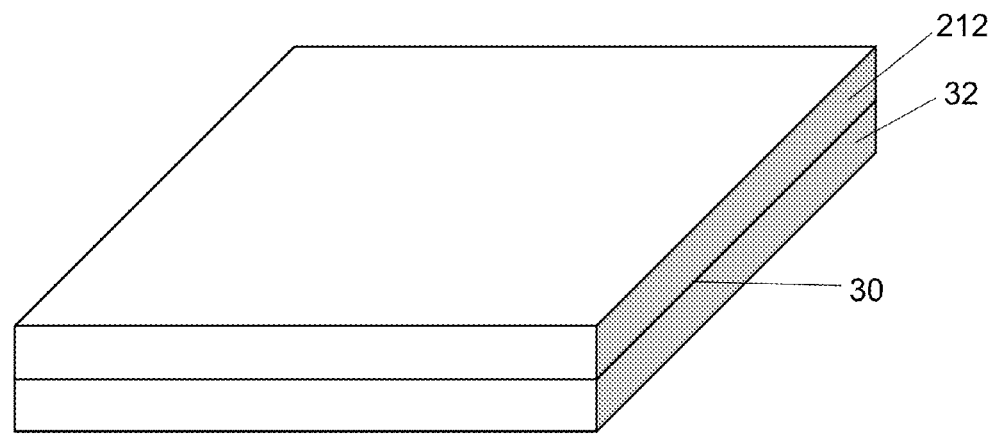
FIG. 3 is an oblique view of another embodiment of the device of FIG. 1, wherein a backing is attached to the device.

Referring to FIG. 3, the bottom surface 30 of the web 212 is attached to a backing 32. In one example, the backing 32 may include a removable pressure sensitive adhesive having a release liner. In another example, the backing 32 may include a fabric layer. The fabric layer may include a plurality of fiberglass strands.

In yet another example, the backing 32 may include a membrane layer. The web 212 easily bonds to moisture resistant membranes. Membranes may be bonded to the web 212 to create a uniform surface for receiving a finish layer. The membrane layer may be made of rubber, polyvinyl chloride, bitumen, or a mixture of two or more thereof.

Figure 4:
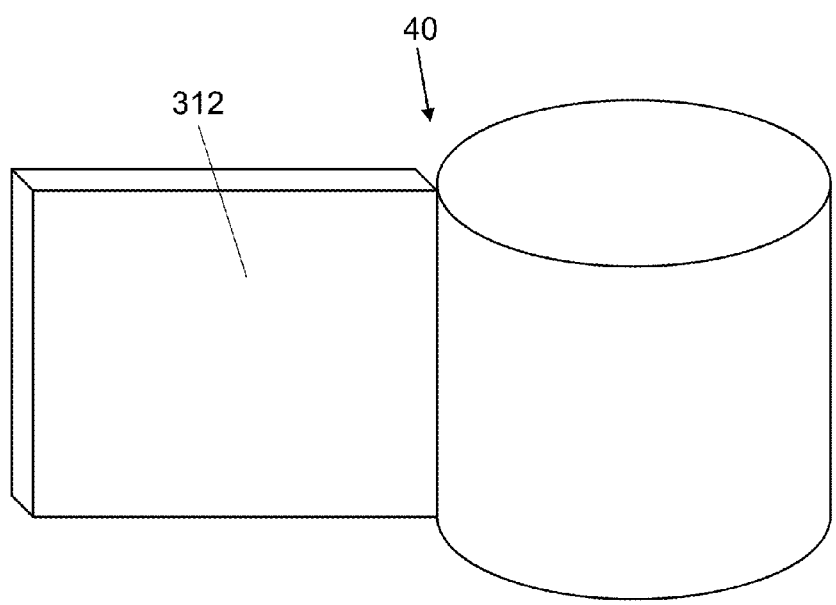
FIG. 4 is an oblique view of yet another embodiment of the device of FIG. 1.

Referring to FIG. 4, the device 10 (FIG. 1) is a roll material 40. The roll material 40 may include web 312 that is rolled onto itself around an axis. The roll material 40 provides for easier installation of the device 10.

In one example, the thickness of the roll material 40 may be in the range of 0.125 inch to 0.75 inch, or in another example, in the range of about 0.25 inch to about 0.375 inch.

In one example, the width of the roll material 40 may be in the range of 5 feet to 15 feet, or in another example, in the range of about 9 feet to about 12 feet.

Figure 5:
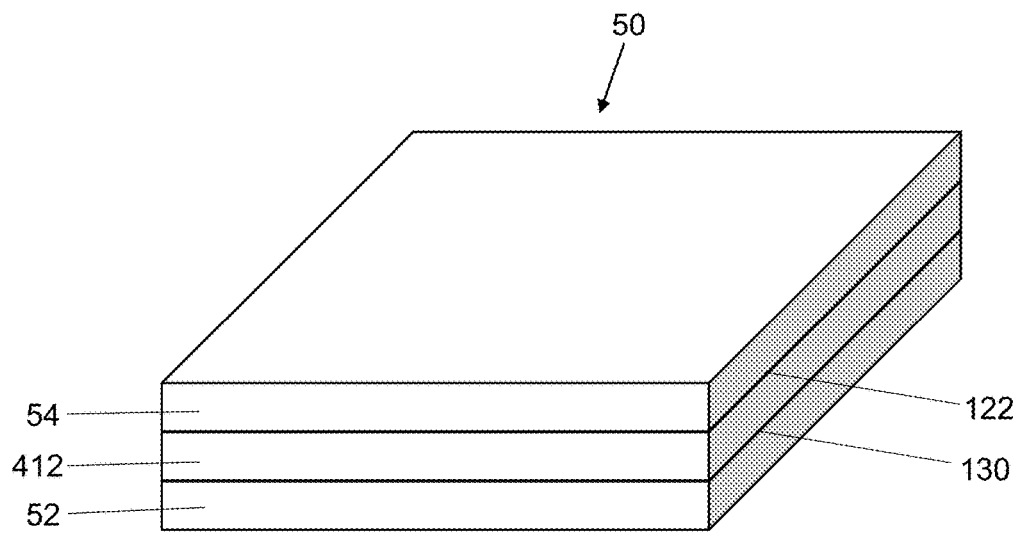
FIG. 5 is an oblique view of an exemplary floor and drainage ventilation system according to the disclosure.

Referring to FIG. 5, a floor ventilation and drainage system is shown at 50. As depicted, the system 50 includes the web 412 having a top surface 122 and a bottom surface 130. A substrate layer 52 faces the bottom surface 130 of the web 412. A finish layer 54 faces the top surface 122 of the web 12.

In one example, the web 412 may be optimized to have significant contact area on the top surface 122. A top surface 122 that is in conjunction with the finish layer 54 provides for a more resilient web 412. The geometry of the web 412 may be developed to enhance this. In one embodiment, the spacer elements shown in FIG. 2 may be developed such that the top surfaces 24 of the spacer elements 20 provide a contact surface of less than 75%, based on the total area covered by the web 412.

Figure 6:
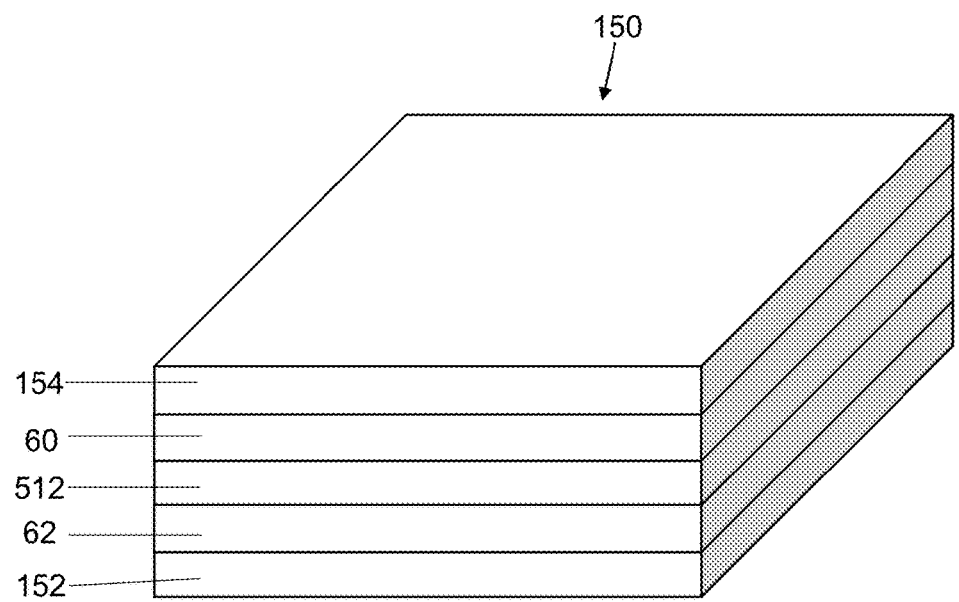
FIG. 6 is an oblique view of an embodiment of the system of FIG. 5, wherein the system includes at least one membrane layer.

Referring to FIG. 6, the system 150 may further include at least one membrane layer 60 or 62 between the finish layer 154 and the web 512 or between the substrate layer 152 and the web 512. As shown, membrane layer 60 is between the finish layer 154 and the web 512 and membrane layer 62 is between the substrate layer 152 and the web 512.

In one example, the substrate layer 152 includes wood, concrete, or a combination there of. When used in conjunction with a concrete substrate layer, the device 10 (FIG. 1) will provide an insulation characteristic that prevents conductive heat transfer. Thus, moisture will not move from the substrate layer 152 to the finish layer 154. The device 10 has particular utility in below grade applications because moisture may be a large problem in construction below ground level.

In one example, the finish layer 154 includes wood, carpet, tile, concrete, or a combination of one or more thereof. In one example, the thickness of the finish layer 154 may be in the range of 0.25 inch to 1 inch, or in another example, in the range of 0.125 inch to 0.875 inch. When the finish layer 154 needs to be replaced, the web 512 may be used permanently and reused.

Figure 7:
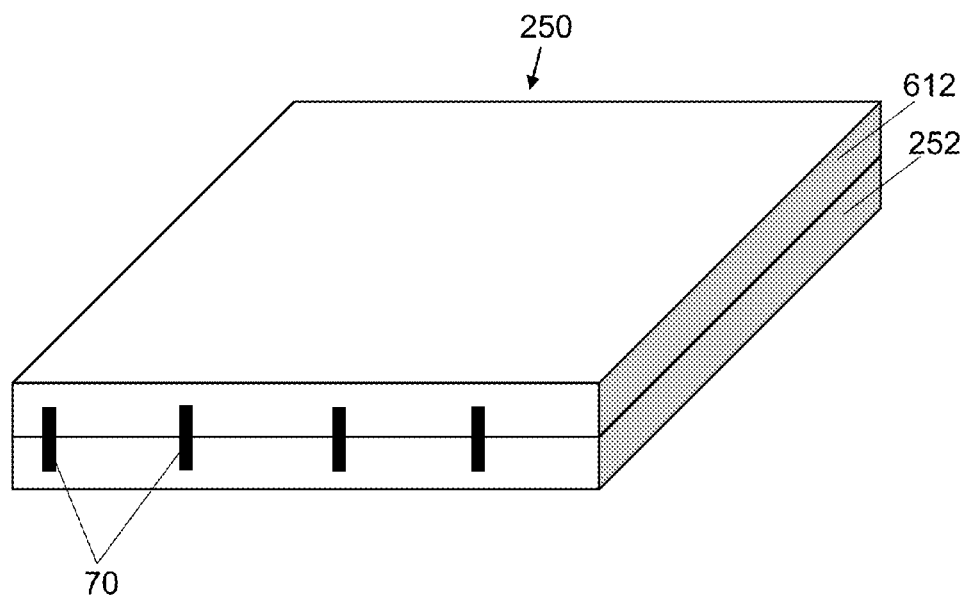
FIG. 7 is an oblique view of another embodiment of the system of FIG. 5, wherein the system includes fasteners.

Referring to FIG. 7, the system 250 includes the web 612 secured to the substrate layer 252 with fasteners 70. The fasteners 70 may include adhesive, staples, nails, screws, or a mixture of two or more thereof.

Figure 8:
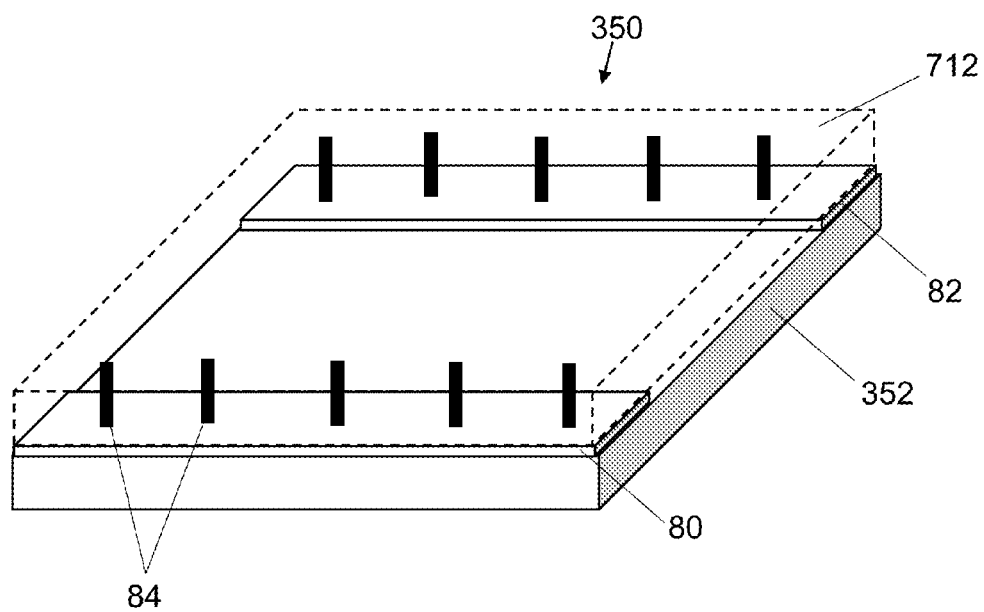
FIG. 8 is an oblique view of yet another embodiment of the system of FIG. 5, wherein the system includes at least one wood strip.

Referring to FIG. 8, the system 350 includes at least one wood strip 80 or 82 attached to the substrate layer 352. The wood strip 80 or 82 has at least one nail 84 protruding upwardly from the wood strip 80 or 82. The web 712 is secured by entangling at least one nail 84 in the web 712.

In one example, the thickness of the wood strip 80 or 82 is in the range of 0.125 inch to 0.75 inch, or in another example, in the range of 0.25 inch to 0.375 inch.

In some embodiments, a method for draining and ventilating a floor includes installing a web 12 of extruded polymer monofilaments 14 between a substrate layer 52 and a finish layer 54. The web 12 may be a roll material 40 installed by rolling out the web 12 such that the bottom surface 30 of the web 12 contacts the substrate layer 54. The roll material 40 is placed for visual seamlessness onto the substrate layer 52 and stretched so that it is smooth on the top surface 22.

In some embodiments, the seams of the roll material 40 may be bound together with tape if they occur in the middle of a room. The finished floor product is often 9 feet to 12 feet in width to accommodate large rooms without seams. The device 10 of this disclosure may be 6 feet in width, which requires less seaming detail because it is unseen by those walking in the room. The seaming may be completed without tape and the edge of the roll material 40 may be formed to allow for simple seaming overlap of the entangled net geometry.

The present disclosure provides a floor drainage and ventilation device, system, and method that further provides cushioning and resiliency. The floor drainage and ventilation device 10 provided by the disclosure includes a web 12 of extruded polymer monofilaments 14. The floor drainage and ventilation system and method provided by the disclosure include a web 12 of extruded polymer monofilaments 14 between a substrate layer 52 and a finish layer 54.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A carpeting drainage and ventilation flooring system comprising:
    a web of extruded polymer monofilaments, the polymer monofilaments being heat welded at junctions to form a three-dimensional matrix of tangled monofilaments, the web having a top surface, a bottom surface, and a plurality of spacer elements projecting upwardly from the top surface of the web, each spacer element having a top surface at an apex of the spacer element;
    a subfloor underlying the bottom surface of the web, the subfloor being composed of wood, tile or concrete; and
    a carpeting layer overlying the top surface of the web;
    wherein the web is resilient and is configured to flex correspondingly with the carpeting layer and to absorb impact from a force applied onto the carpeting layer.

2. The system of claim 1, wherein the polymer monofilaments are made of a material selected from polyolefin, polyamide, polyester, polyvinylhalide, polystyrene, polyvinylester, or a mixture of two or more thereof.

3. The system of claim 1, wherein the polymer monofilaments are made of a material selected from polyethylene, polypropylene, or a mixture thereof.

4. The system of claim 1, wherein the polymer monofilaments have an average diameter in the range from 1 mil to 4 mils.

5. The system of claim 1, wherein the top surfaces of the plurality of upwardly projecting spacer elements provide a contact surface of less than 75%, based on the total area covered by the web.

6. The system of claim 1, wherein the web further includes anti-microbial ingredients.

7. The system of claim 1, further comprising a backing attached to the bottom surface of the web.

8. The system of claim 7, wherein the backing comprises a removable pressure sensitive adhesive having a release liner.

9. The system of claim 7, wherein the backing comprises a fabric layer.

10. The system of claim 9, wherein the fabric layer comprises a plurality of fiberglass strands.

11. The system of claim 1, further comprising at least one membrane layer between the carpeting layer and the web or between the subfloor and the web.

12. The system of claim 11, wherein the membrane layer is made of rubber, polyvinyl chloride, bitumen, or a mixture of two or more thereof.

13. The system of claim 1, wherein the web is a roll material.

14. The system of claim 1, wherein the web is secured to the subfloor with adhesive, staples, nails, screws, or a mixture of two or more thereof.

15. The system of claim 1, further including at least one wood strip attached to the subfloor, the wood strip having at least one nail protruding upwardly from the wood strip, wherein the web is secured by entangling the nail in the web.

16. A method for draining and ventilating a floor, the method comprising:

installing a web of extruded polymer monofilaments between a subfloor and a carpeting layer, the polymer monofilaments being heat welded at junctions to form a three-dimensional matrix of tangled monofilaments, and the web having a top surface, a bottom surface, and a plurality of spacer elements projecting upwardly from the top surface of the web, each spacer element having a top surface at an apex of the spacer element;

the subfloor underlying the bottom surface of the web and being composed of wood, tile or concrete; and the carpeting layer overlying the top surface of the web, the installation of the web allowing the web to flex correspondingly with the carpeting layer and to absorb impact from a force applied onto the carpeting layer.

17. The method of claim 16, wherein the web is a roll material installed by rolling out the web such that the bottom surface contacts the subfloor.

\* \* \* \* \*